US006282451B1

(12) United States Patent
White

(10) Patent No.: US 6,282,451 B1
(45) Date of Patent: Aug. 28, 2001

(54) METHOD AND APPARATUS FOR ALLOWING OR DISRUPTING PASSAGE OF POWER IN ELECTRICAL APPLIANCES

(76) Inventor: Lawrence D. White, 102 Stephen Dr., West Monroe, LA (US) 71292

( * ) Notice: Subject to any disclaimer, the term of this patent is extended or adjusted under 35 U.S.C. 154(b) by 0 days.

(21) Appl. No.: 09/198,412

(22) Filed: Nov. 24, 1998

(51) Int. Cl.[7] .......................... G05B 11/01; G06F 17/60; H04Q 7/12

(52) U.S. Cl. .................................. 700/22; 700/9; 700/17; 700/292; 725/25; 705/56; 340/825.22

(58) Field of Search ............................. 700/75, 292, 297, 700/9, 17, 232, 237, 22; 725/26, 25; 705/52, 55, 56, 67, 73, 77, 79, 29; 340/502, 505, 539, 568.1, 568.2, 825.22

(56) References Cited

U.S. PATENT DOCUMENTS 4,085,422 4/1978 Niwata et al. ....................... 380/207
4,494,114 1/1985 Kaish ................................. 340/5.31
4,549,179 10/1985 Stenardo ......................... 340/825.69
4,665,397 * 5/1987 Pinnow ........................... 340/825.56
4,700,296 10/1987 Palmer, Jr. et al. ................... 705/32
4,845,484 7/1989 Ellsberg .............................. 340/5.92
5,289,372 2/1994 Guthrie et al. ......................... 705/28
5,495,531 * 2/1996 Smiedt .................................. 705/59
5,510,780 * 4/1996 Norris et al. .................... 340/825.56
5,537,612 7/1996 Cherrick et al. ...................... 380/242
5,563,586 10/1996 Baum et al. .................... 340/825.07
5,631,947 * 5/1997 Wittstein et al. .................... 455/409
5,671,251 * 9/1997 Blackwell et al. ................... 375/222
5,767,771 6/1998 Lamont ................................ 340/571
5,802,467 * 9/1998 Salazar et al. ....................... 455/420
5,903,226 * 5/1999 Suman et al. ................... 340/825.69
5,909,183 * 6/1999 Borgstahl et al. .............. 340/825.22
5,964,877 * 10/1999 Victor et al. ......................... 713/202
6,130,412 * 10/2000 Sizemore ............................ 219/481
6,141,652 * 10/2000 Reeder .................................. 705/53

FOREIGN PATENT DOCUMENTS 57-4802 1/1982 (JP) .
62-95041 5/1987 (JP) .

* cited by examiner

*Primary Examiner*—William Grant
*Assistant Examiner*—Paul Rodriguez
(74) *Attorney, Agent, or Firm*—Richard C. Litman

(57) ABSTRACT

A method and apparatus for allowing or disrupting passage of power in electrical appliances includes a portable wireless remote control device and a device in the form of an electronic circuit contained within one particular electrical appliance that is adapted for allowing or disrupting passage of power in the electrical appliance based upon wireless signals received from the wireless remote control device. The electrical appliance may be any of a variety of electrical appliance, such as a television, a video cassette recorder, a computer, a washer, a dryer, and the like. The wireless remote control device includes a housing. The housing includes mounted therein a display, thirteen input keys each representing two letters of the alphabet, and ten input keys respectively representing the numbers zero through nine. The housing also includes a DELETE input key, an ENTER input key, a left cursor input key, a right cursor input key, a down cursor input key, and an up cursor input key. The housing also includes a power cord which leads to a connector adapted for electrically connecting to an AC or DC power source external of the remote control device. An electrical appliance configured in accordance with the invention is equipped with a device in the form of an electronic circuit including an antenna, a wireless transceiver, a discriminator, an analog to digital and digital to analog converter, a digital logic controller, a memory, and a relay.

7 Claims, 4 Drawing Sheets

METHOD AND APPARATUS FOR ALLOWING OR DISRUPTING PASSAGE OF POWER IN ELECTRICAL APPLIANCES

BACKGROUND OF THE INVENTION

1. Field of the Invention

The present invention relates to electronic control systems and methods of disabling electrical equipment and, more particularly, to a method and apparatus for allowing or disrupting passage of power in electrical equipment, such as appliances or the like which may be rented out for temporary use.

2. Description of the Related Art

There are many establishments which specialize in the rental of electrical appliances such as televisions, video cassette recorders, washers, dryers, and the like. Such electrical appliances are usually rented for a specified period of time for which a rental fee is paid by the renter of the electrical appliance. A general problem associated with such electrical appliances that have been rented is the failure of the renter to return the rented electrical appliance within the specified period of time, while at the same time continuing to operate the electrical appliance.

Efforts to make it impossible to operate electrical appliances when a predetermined period of time is reached include the incorporation of devices such as timers into electrical appliances.

The related art is represented by the following patents of interest.

U.S. Pat. No. 4,085,422, issued on Apr. 18, 1978 to Tatuji Niwata et al., describes a video security system for pay-TV that can disturb an image on the screen of a TV receiver for fee-charged viewing thereof. Niwata et al. do not suggest a method and apparatus for allowing or disrupting passage of power in electrical appliances according to the claimed invention.

U.S. Pat. No. 4,494,114, issued on Jan. 15, 1985 to Norman Kaish, describes a security arrangement for rendering microprocessor-controlled electronic equipment inoperative after the occurrence of a disabling event. Kaish does not suggest a method and apparatus for allowing or disrupting passage of power in electrical appliances according to the claimed invention.

U.S. Pat. No. 4,549,179, issued on Oct. 22, 1985 to William J. Stenardo, describes a remote control system for remotely controlling the audio volume on electronic equipment having an audio output and particularly on electronic home entertainment equipment possessing an earphone connection. Stenardo does not suggest a method and apparatus for allowing or disrupting passage of power in electrical appliances according to the claimed invention.

U.S. Pat. No. 4,700,296, issued on Oct. 13, 1987 to Roy A. Palmer, Jr. et al., describes an electronic access control system for appliance type means, such as refrigerators, televisions, washers, dryers, and the like. Palmer, Jr. et al. do not suggest a method and apparatus for allowing or disrupting passage of power in electrical appliances according to the claimed invention.

U.S. Pat. No. 4,845,484, issued on Jul. 4, 1989 to Thomas R. Ellsberg, describes an automatic audit system for "tracking" the single-copy sales of newspapers in newspaper rack machines. Ellsberg does not suggest a method and apparatus for allowing or disrupting passage of power in electrical appliances according to the claimed invention.

U.S. Pat. No. 5,289,372, issued on Feb. 22, 1994 to Jon E. Guthrie et al., describes an equipment tracking system that provides current and accurate configuration management information regarding the physical status of computer-related equipment. Guthrie et al. do not suggest a method and apparatus for allowing or disrupting passage of power in electrical appliances according to the claimed invention.

U.S. Pat. No. 5,537,612, issued on Jul. 16, 1996 to Sol M. Cherrick et al., describes a remote control hand-set means for disrupting the normal operation of a television receiver. Cherrick et al. do not suggest a method and apparatus for allowing or disrupting passage of power in electrical appliances according to the claimed invention.

U.S. Pat. No. 5,563,586, issued on Oct. 8, 1996 to Matthew C. Baum et al., describes an apparatus for limiting access to control of electrically operated equipment. Baum et al. do not suggest a method and apparatus for allowing or disrupting passage of power in electrical appliances according to the claimed invention.

U.S. Pat. No. 5,767,771, issued on Jun. 16, 1998 to Leonard A. Lamont, describes an electronic equipment theft deterrent system. Lamont does not suggest a method and apparatus for allowing or disrupting passage of power in electrical appliances according to the claimed invention.

Japan Patent document 57-4802, published on Jan. 11, 1982, describes a retrieval device for raising the efficiency of inventory control. Japan '802 does not suggest a method and apparatus for allowing or disrupting passage of power in electrical appliances according to the claimed invention.

Japan Patent document 62-95041, published on May 1, 1987, describes an information service system. Japan '041 does not suggest a method and apparatus for allowing or disrupting passage of power in electrical appliances according to the claimed invention.

None of the above inventions and patents, taken either singularly or in combination, is seen to describe the instant invention as claimed.

SUMMARY OF THE INVENTION

The present invention is a method and apparatus for allowing or disrupting passage of power in electrical appliances that includes a wireless remote control device and a device in the form of an electronic circuit adapted for allowing or disrupting passage of power in an electrical appliance based upon wireless signals received from the wireless remote control device. The wireless remote control device may communicate with the electronic circuit in the electrical appliance by radio frequency signals, microwave signals, magnetic wave signals, infrared signals, optical signals, acoustic signals, or other signal types known in the art. The electrical appliance may be any one of a variety of electrical appliances, such as a television, a video cassette recorder, a computer, a washer, a dryer, and the like.

The inventive wireless remote control device includes a housing. The housing includes mounted therein a display, thirteen input keys each representing two letters of the alphabet, and ten input keys respectively representing the numbers zero through nine. The housing also includes a DELETE input key, an ENTER input key, a left cursor input key, a right cursor input key, a down cursor input key, and an up cursor input key. The housing also includes a power cord which leads to a connector adapted for being electrically connected to an alternating current (AC) or direct current (DC) power source external of the wireless remote control device. For example, the connector could be adapted for being electrically connected to an automotive vehicle DC battery via a cigarette lighter slot in the automotive vehicle.

Elements contained within a wireless remote control device according to the invention include an antenna, a wireless transceiver, a discriminator, an analog to digital and digital to analog converter, a digital logic controller, a memory, a display, and input keys. Wireless signals are coupled to and from open space via the antenna. The wireless remote control device wireless transceiver transmits and receives wireless signals. Typical wireless transceiver functions include signal detection, modulation, demodulation, amplification, and noise reduction. Carrier frequencies are provided by a frequency synthesizer which is controlled by the digital logic controller.

The discriminator evaluates received signals and passes an output to the analog to digital and digital to analog converter when a suitable signal is identified. The wireless transceiver may receive a signal modulated with a digital code word or a tone signal. In that case, the discriminator then decodes the code word or demodulates the carrier and changes state only in the event the correct code word or tone signal is identified in a reception.

The analog to digital and digital to analog converter provides digital to analog and analog to digital signal conversion for signal processing and communication in both analog and digital form. The analog to digital and digital to analog converter is electrically connected to the digital logic controller. The memory, the display, and the input keys are also electrically connected to the digital logic controller. The wireless remote control device receives power from an external AC or DC power source, such as an automotive vehicle battery.

When the wireless remote control device is transmitting a wireless signal, a user enters an appliance identification code utilizing the input keys. Once the identification code has been entered, the user can confirm the code on the display. Once an identification code has been properly entered, the user depresses the ENTER input key and transmits a control signal to the selected electrical appliance. Upon properly receiving the wireless signal transmitted from the wireless remote control device, the electrical appliance transmits a wireless signal back to the wireless remote control device to indicate the operational status of the electrical appliance.

An electrical appliance configured according to the invention is equipped with a device in the form of an electronic circuit that includes an antenna, a wireless transceiver, a discriminator, an analog to digital and digital to analog converter, a digital logic controller, a memory, and a relay. Wireless signals are coupled to and from open space via the antenna. The wireless transceiver transmits and receives wireless signals. Typical wireless transceiver functions include signal detection, modulation, demodulation, amplification, and noise reduction. Carrier frequencies are provided by a frequency synthesizer which is controlled by the digital logic controller.

The discriminator evaluates received signals and passes an output to the analog to digital and digital to analog converter when a suitable signal is identified. The electronic circuit wireless transceiver may receive a signal modulated with a digital code word or tone signal. In that case, the discriminator then decodes the code word or demodulates the carrier and changes state only in the event the correct code word or tone signal is identified in a reception.

The analog to digital and digital to analog converter provides digital to analog and analog to digital signal conversion for signal processing and communication in both analog and digital form. The analog to digital and digital to analog converter is electrically connected to the digital logic controller. The memory and the relay are also electrically connected to the digital logic controller. The relay connects to a main power or circuit line of the electrical appliance to selectively allow or disrupt passage of power between the electrical appliance and the power source external of the electrical appliance. The electronic circuit receives power through the power wiring of the electrical appliance via an AC or DC power source external of the electrical appliance.

A method for selectively allowing or disrupting passage of power between an electrical appliance and a power source external of the electrical appliance utilizing the wireless remote control device and the electronic circuit described above comprises the steps of:

(a) electrically connecting the electronic circuit between the electrical appliance and the power source external of the electrical appliance;

(b) selecting the wireless remote control device;

(c) entering data in the wireless remote control device digital logic controller with selected input keys that represent an identification code of the electrical appliance;

(d) having the wireless remote control device transmit a wireless signal to the electronic circuit;

(e) having the electronic circuit receive the wireless signal transmitted by the wireless remote control device;

(f) evaluating the transmitted wireless signal to determine whether the wireless signal includes an identification code associated with the electrical appliance;

(g) allowing or disrupting passage of power between the electrical appliance and the power source external of the electrical appliance based on a wireless signal received by the electronic circuit that has been evaluated and includes an identification code associated with the electrical appliance;

(i) having the electronic circuit transmit a wireless signal to the wireless remote control device;

(j) having the wireless remote control device receive the wireless signal transmitted by the electronic circuit;

(k) evaluating the wireless signal transmitted by the electronic circuit to determine whether the wireless signal includes an identification code associated with the electrical appliance; and, (l) displaying a status indication of the electronic circuit on the wireless remote control device display based on a wireless signal received by the wireless remote control device that has been evaluated and includes an identification code associated with the electrical appliance.

Accordingly, it is a principal object of the invention to provide a method and apparatus for allowing or disrupting passage of power in electrical appliances that includes a portable wireless remote control device and a device in the form of an electronic circuit adapted for disabling an electrical appliance based upon wireless signals received from the wireless remote control device.

It is an object of the invention to provide improved elements and arrangements thereof in a method and apparatus for allowing or disrupting passage of power in electrical appliances for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENT

In accordance with the present invention, a method and apparatus for allowing or disrupting passage of power in electrical appliances includes a portable wireless remote control device and a device adapted for allowing or disrupting passage of power in an electrical appliance based upon signals received from the wireless remote control device.

Figure 1:
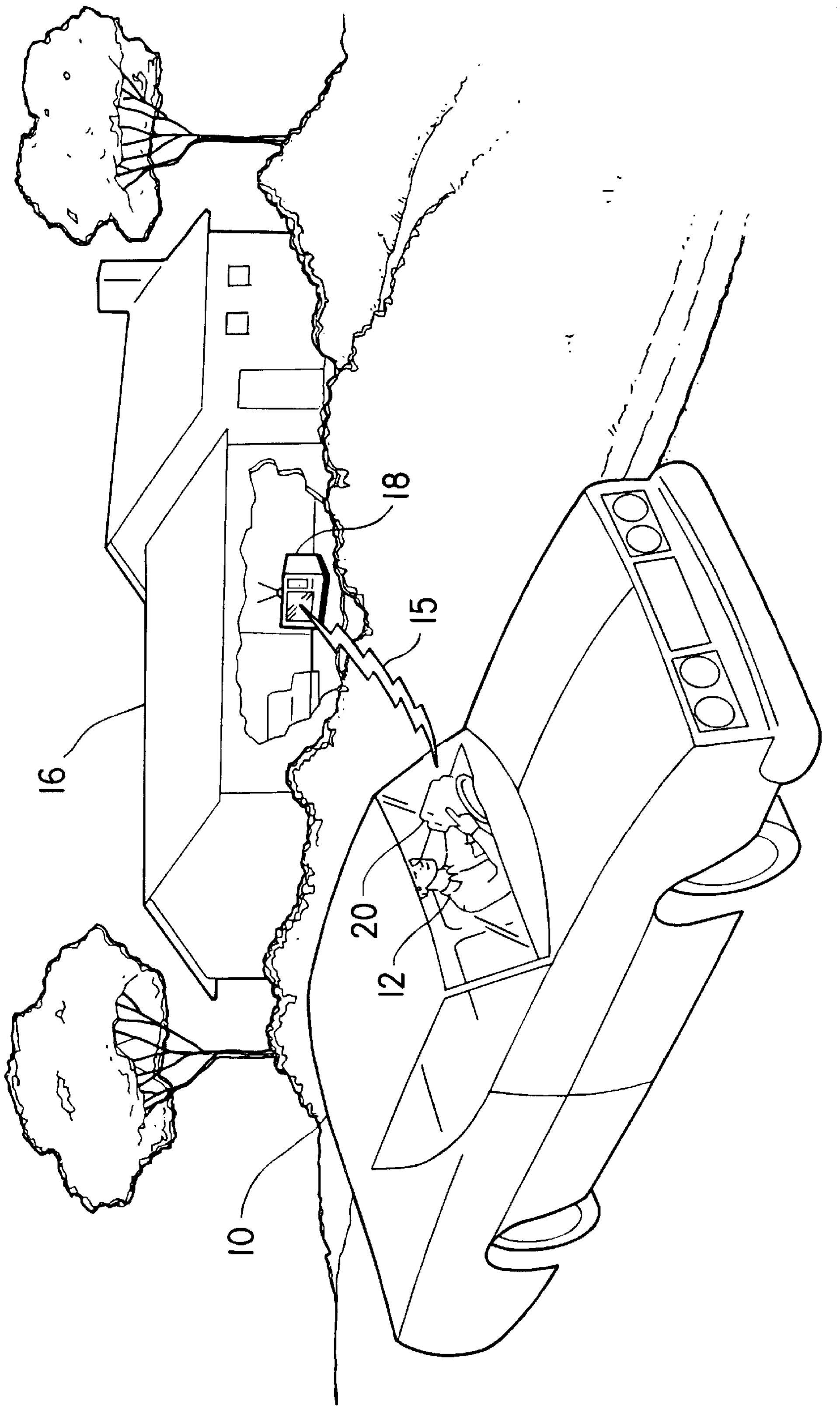
FIG. 1 is an environmental, perspective view of an apparatus for allowing or disrupting passage of power in an electrical appliance according to the present invention.

The inventive control system is shown in use in FIG. 1. An automotive vehicle 10 is shown being driven by an individual who possesses a wireless remote control device 20. The individual transmits a wireless signal 15 which may travel for a significant distance. The wireless signal 15 may only be recognized by a device in the form of an electronic circuit contained within one particular electrical appliance, shown here as a television 18, contained within a residence 16. However, the electrical appliance may be any of a variety of electrical appliances, such as a video cassette recorder, a computer, a washer, a dryer, and the like. The wireless remote control device 20 may communicate with the electronic circuit contained within the television 18 by radio frequency signals, microwave signals, magnetic wave signals, infrared signals, optical signals, acoustic signals, or other signal types known in the art. For example, in an underwater environment a sonar signal could be utilized.

The television 18 includes a device in the form of an electronic circuit contained therein which detects the transmitted wireless signal 15 and evaluates whether the transmitted wireless signal 15 is intended for the television 18. If the transmitted wireless signal 15 is intended for the television 18, the electronic circuit contained within the television 18 responds to the wireless signal and selectively allows or disrupts passage of power between the television 18 and a power source external of the television 18.

Figure 2:
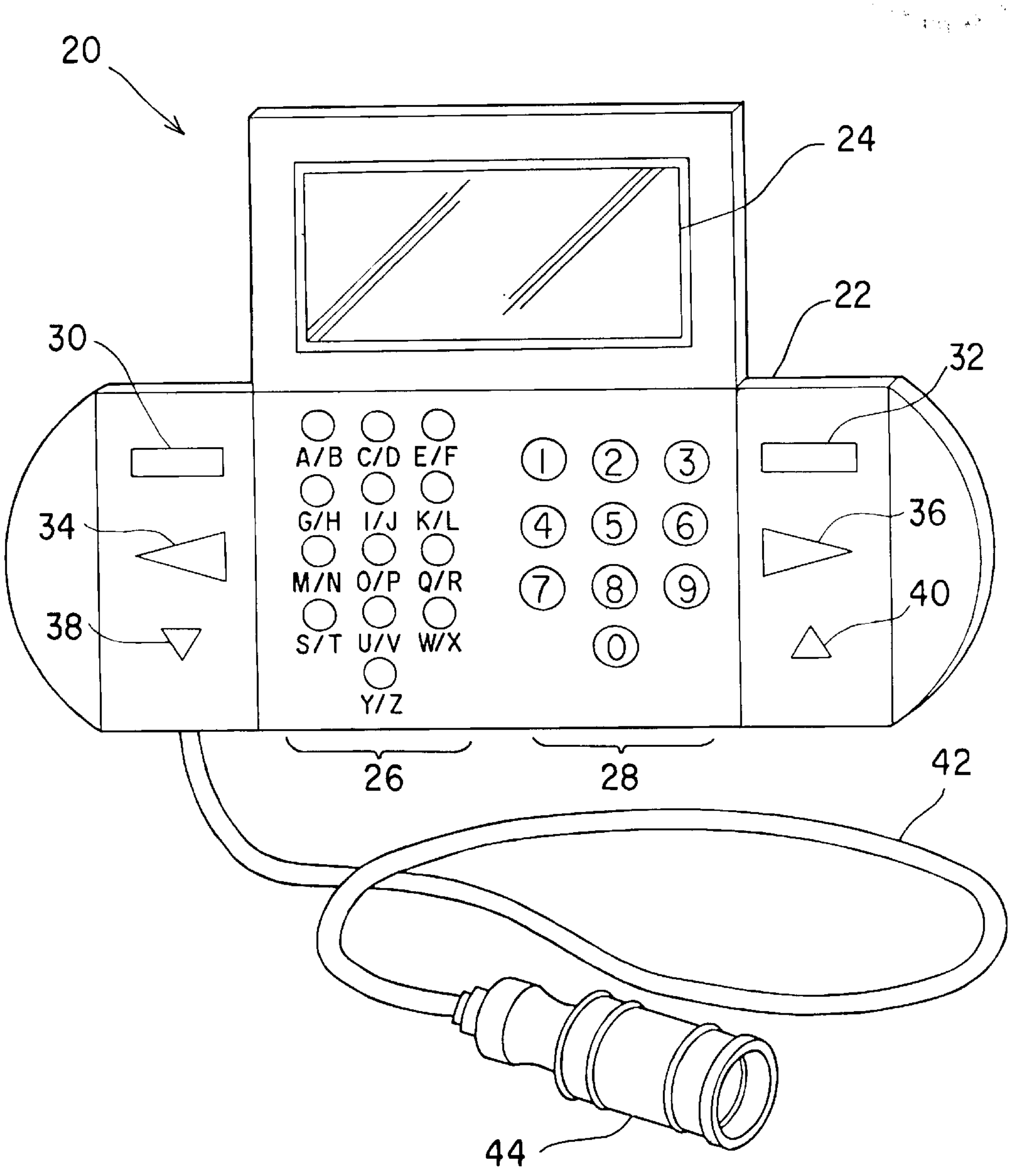
FIG. 2 is front, perspective view of a wireless remote control device according to the present invention.

A front perspective view of a wireless remote control device 20 is shown in FIG. 2. As shown, the wireless remote control device 20 includes a housing 22. The housing 22 includes mounted therein a display 24, thirteen input keys 26 each representing two letters of the alphabet, and ten input keys 28 respectively representing the numbers zero through nine. While the display 24 is preferably a liquid crystal display, it may be any type of display known in the art. The housing 22 also includes a DELETE input key 30, an ENTER input key 32, a left cursor input key 34, a right cursor input key 36, a down cursor input key 38, and an up cursor input key 40. The housing 22 also includes a power cord 42 which leads to connector 44 adapted for being electrically connected to a DC power source external of the remote control device 20, such as a cigarette lighter slot of an automotive vehicle (not shown). Alternatively, the power cord 42 may be adapted for being electrically connected to an AC power source external of the remote control device 20.

Figure 3:
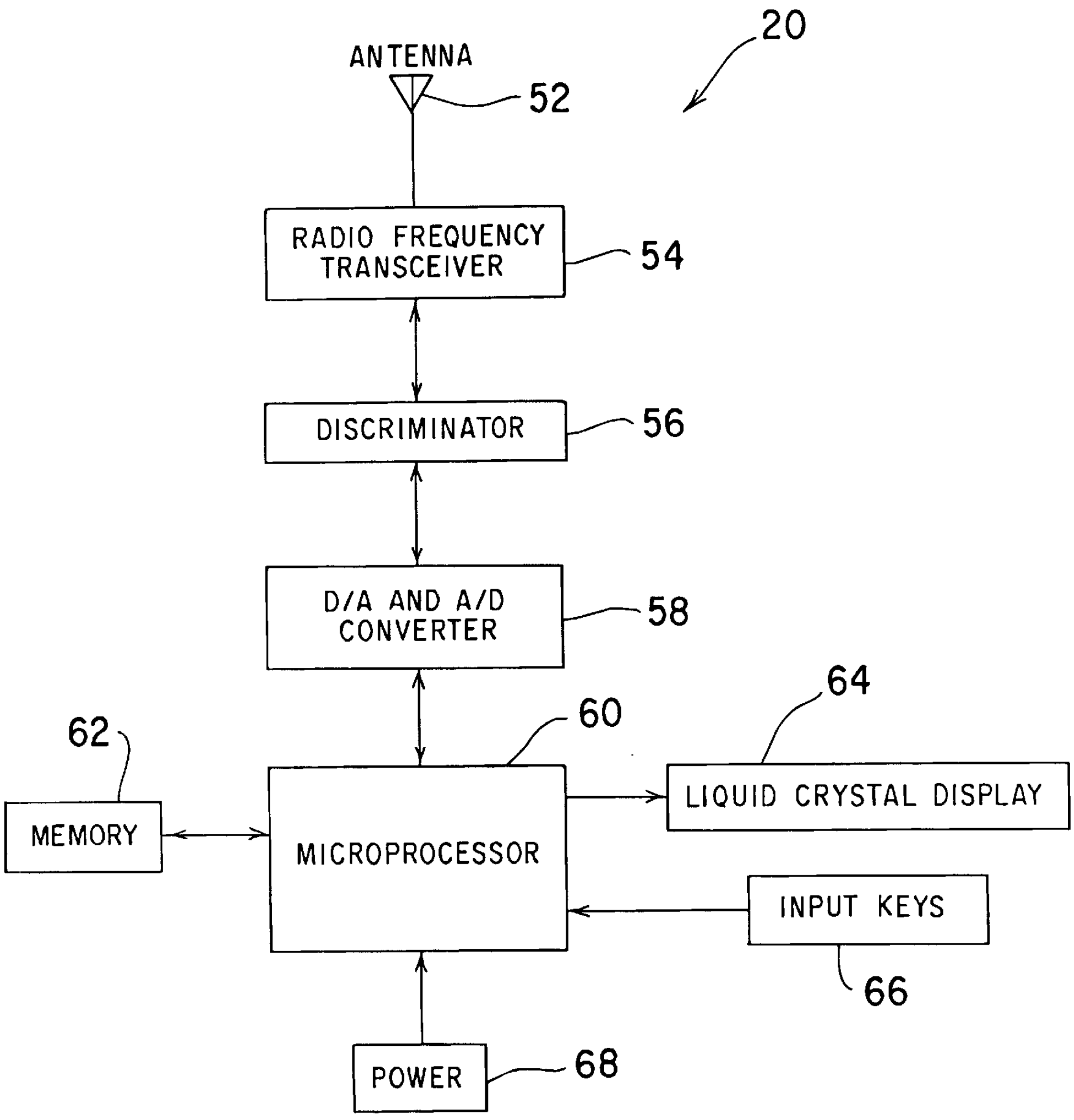
FIG. 3 is a block diagram of a wireless remote control device according to the present invention.

A block diagram of elements contained within a wireless remote control device according to the invention is shown in FIG. 3. The wireless remote control device 20 includes an antenna 52, a wireless transceiver 54, a discriminator 56, an analog to digital and digital to analog converter 58, a digital logic controller 60, a memory 62, a display 64, input keys 66, and means for receiving power 68. Wireless signals are coupled to and from open space via the antenna 52. The wireless transceiver 54 transmits and receives wireless signals. Typical wireless transceiver functions include signal detection, modulation, demodulation, amplification, and noise reduction. Carrier frequencies are provided by a frequency synthesizer which is controlled by the digital logic controller 60.

The discriminator 56 evaluates received wireless signals and passes an output to the analog to digital and digital to analog converter 58 when a suitable wireless signal is identified. The discriminator 56 may be any device or circuit that can convert a wireless signal and remove the carrier of a transmitted wireless signal. The transceiver 54 may receive a wireless signal modulated with a digital code word or tone signal. In that case, the discriminator 56 then decodes the code word or demodulates the carrier and changes state only in the event the correct code word or tone signal is identified in a reception.

The analog to digital and digital to analog converter 58 provides digital to analog and analog to digital signal conversion for signal processing and communication in both analog and digital form. The analog to digital and digital to analog converter 58 may be any device or circuit capable of converting a demodulated signal into binary levels suitable for computer processing. The analog to digital and digital to analog converter 58 is electrically connected to the digital logic controller 60. The memory 62, the display 64, and the input keys 66 are also electrically connected to the digital logic controller 60. The means for receiving power 68 represents a device such as a connector which may be used to receive power externally from an AC or DC power source, such as an automotive vehicle battery (not shown).

When the wireless remote control device 20 is transmitting a wireless signal, a user enters an appliance identification code utilizing the input keys 26,28 shown in FIG. 2. Once the identification code has been entered, the user can confirm the code on the display 24. Once an identification code has been properly entered, the user depresses the ENTER input key 32 and transmits a wireless control signal to the selected electrical appliance. Upon properly receiving the wireless signal transmitted from the wireless remote control device, the electrical appliance transmits a wireless signal back to the wireless remote control device to indicate the operational status of the electrical appliance.

Figure 4:
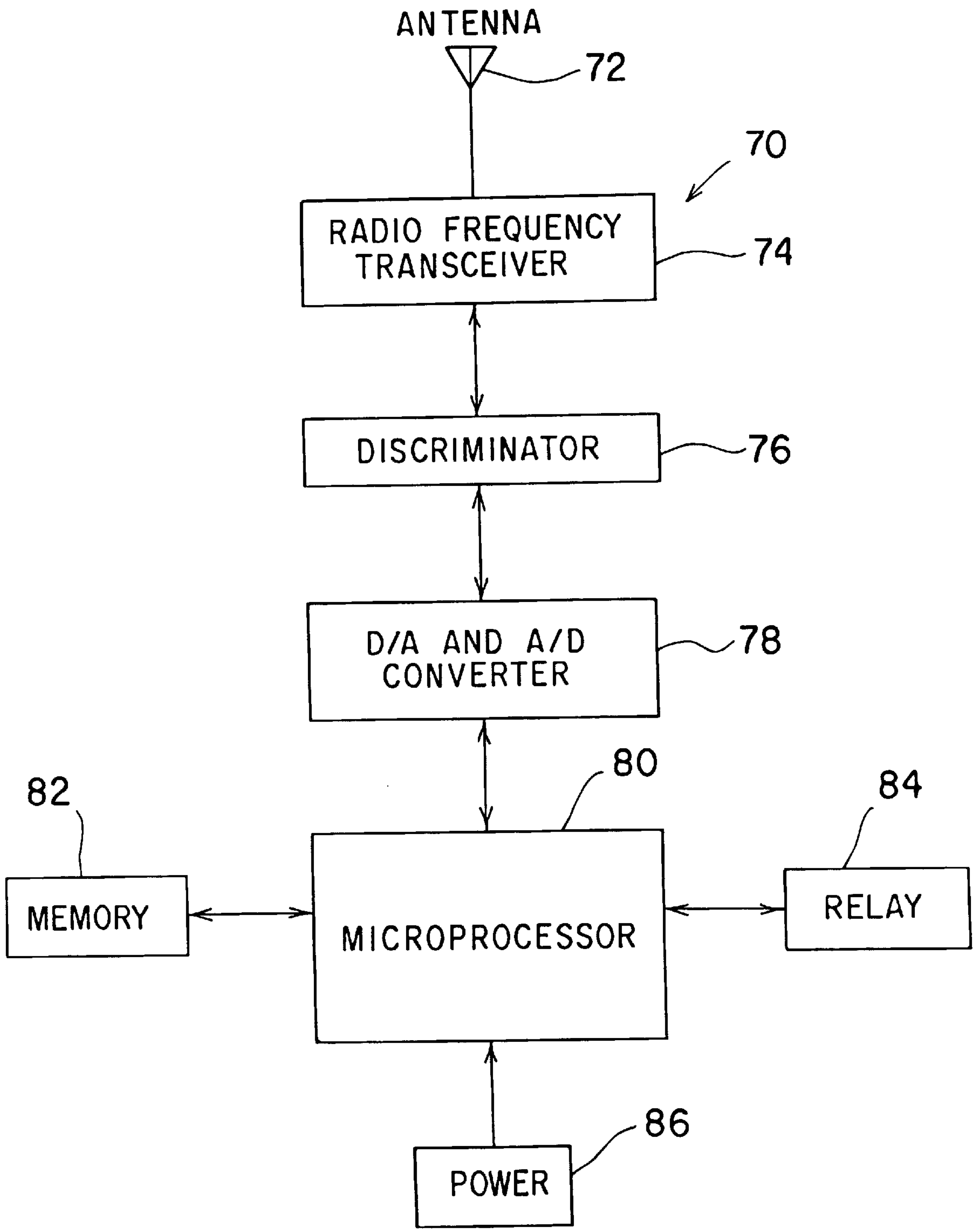
FIG. 4 is a block diagram of a device adapted for mounting in an electrical appliance that disables the electrical appliance upon receiving a wireless control signal from a wireless remote control device according to the present invention.

An electrical appliance equipped according to the invention includes the elements shown in block diagram form in FIG. 4. The electrical appliance is equipped with a device in the form of an electronic circuit 70 which includes an antenna 72, a wireless transceiver 74, a discriminator 76, an analog to digital and digital to analog converter 78, a digital logic controller 80, a memory 82, a relay 84, and means for receiving power 86. Wireless signals are coupled to and from open space via the antenna 72. The wireless transceiver 74 transmits and receives wireless signals. Typical wireless transceiver functions include signal detection, modulation, demodulation, amplification, and noise reduction through compounding techniques. Carrier frequencies are provided by a frequency synthesizer which is controlled by the digital logic controller 80.

The discriminator 76 evaluates received wireless signals and passes an output to the analog to digital and digital to analog converter 78 when a suitable signal is identified. The discriminator 76 may be any device or circuit that can convert a wireless signal and remove the carrier of a transmitted wireless signal. The transceiver 74 may receive a wireless signal modulated with a digital code word or tone signal. In that case, the discriminator 76 then decodes the code word or demodulates the carrier and changes state only in the event the correct code word or tone signal is identified in a reception.

The analog to digital and digital to analog converter 78 provides digital to analog and analog to digital signal conversion for signal processing and communication in both analog and digital form. The analog to digital and digital to analog converter 78 may be any device or circuit capable of converting a demodulated signal into binary levels suitable for computer processing. The analog to digital and digital to analog converter 78 is electrically connected to the digital logic controller 80. The memory 82 and the relay 84 are also electrically connected to the digital logic controller 80. The relay 84, which may formed of mechanical or solid state elements, connects to a main power or circuit line of the electrical appliance to selectively allow or disrupt passage of power between the electrical appliance and a power source external of the electrical appliance. The means for receiving power 86 represents a manner in which power may be received through the power wiring of the electrical appliance by an external AC or DC power source.

A method for selectively allowing or disrupting passage of power between an electrical appliance and a power source external of the electrical appliance utilizing the wireless remote control device 20 and the electronic circuit 70 described above comprises the steps of:

(a) electrically connecting the electronic circuit 70 between the electrical appliance and the power source external of the electrical appliance;

(b) selecting the wireless remote control device 20;

(c) entering data in the remote control device digital logic controller 60 with selected input keys that represent an identification code of the electrical appliance;

(d) having the wireless remote control device 20 transmit a wireless signal to the electronic circuit 70;

(e) having the electronic circuit 70 receive the wireless signal transmitted by the wireless remote control device 20;

(f) evaluating the transmitted wireless signal to determine whether the wireless signal includes an identification code associated with the electrical appliance;

(g) allowing or disrupting passage of power between the electrical appliance and the power source external of the electrical appliance based on a wireless signal received by the electronic circuit 70 that has been evaluated and includes an identification code associated with the electrical appliance;

(i) having the electronic circuit 70 transmit a wireless signal to the wireless remote control device 20;

(j) having the wireless remote control device 20 receive the wireless signal transmitted by the electronic circuit 70;

(k) evaluating the wireless signal transmitted by the electronic circuit 70 to determine whether the wireless signal includes an identification code associated with the electrical appliance; and, (l) displaying a status indication of the electronic circuit 70 on the wireless remote control device display 64 based on a wireless signal received by the wireless remote control device 20 that has been evaluated and includes an identification code associated with the electrical appliance.

It is to be understood that the present invention is not limited to the embodiment described above, but encompasses any and all embodiments within the scope of the following claims.

I claim:

1. A system for selectively allowing or disrupting passage of power between an electrical appliance and a power source external of the electrical appliance, said system comprising:

a wireless remote control (RC) device comprising:

(a) an RC antenna;

(b) an RC digital logic controller for generating a plurality of control signals used to operate said wireless remote control device;

(c) an RC memory device coupled to said RC digital logic controller;

(d) an RC wireless transceiver coupled to said RC digital logic controller that transmits and receives wireless signals;

(e) an RC discriminator coupled to said RC digital logic controller that evaluates received wireless signals; and, (f) an RC analog to digital and digital to analog converter coupled to said RC digital logic controller that provides digital to analog and analog to digital signal conversion for signal processing and communication in both analog and digital form;

an electronic circuit (EC) adapted for being electrically connected between the electrical appliance and the power source external of the electrical appliance, said electronic circuit comprising:

(a) an EC antenna;

(b) an EC digital logic controller for generating a plurality of control signals used to operate said electronic circuit;

(c) an EC memory device coupled to said EC digital logic controller;

(d) an EC wireless transceiver coupled to said EC digital logic controller that transmits and receives wireless signals;

(e) an EC discriminator coupled to said EC digital logic controller that evaluates received wireless signals;

(f) an EC analog to digital and digital to analog converter coupled to said EC digital logic controller that provides digital to analog and analog to digital signal conversion for signal processing and communication in both analog and digital form;

(g) a relay coupled to said EC digital logic controller that selectively allows or disrupts passage of power between an electrical appliance and a power source external of the electrical appliance; and (h) means for responding to a transmission from the wireless remote control device by indicating the operational status of the electrical appliance; and an appliance code identifying the electrical appliance, the appliance code being stored in the memory device of said electronic circuit, said EC digital logical controller being programmed to respond only to a signal encoded with the appliance code.

2. A system according to claim 1, wherein said remote control device wireless transceiver and said electronic circuit wireless transceiver communicate utilizing signals selected from the group consisting of radio frequency signals, microwave signals, magnetic field signals, infrared signals, optical signals, and acoustic signals.

3. A system according to claim 1, wherein said remote control device further comprises a plurality of input keys and a display device for displaying messages generated by said RC digital logic controller.

4. A system according to claim 3, wherein said display device is a liquid crystal display device.

5. A system according to claim 3, wherein said plurality of input keys comprise thirteen input keys each representing two letters of the alphabet, ten input keys respectively representing the numbers zero through nine, a DELETE input key, an ENTER input key, a left cursor input key, a right cursor input key, a down cursor input key, and an up cursor input key.

6. A method for selectively allowing or disrupting passage of power between an electrical appliance and a power source external of the electrical appliance, said method comprising the steps of:

(a) electrically connecting an electronic circuit (EC) between an electrical appliance and a power source external of the electrical appliance, said electronic circuit comprising an EC antenna, an EC digital logic controller for generating a plurality of control signals used to operate said electronic circuit, an EC memory device coupled to said EC digital logic controller, an EC wireless transceiver coupled to said EC digital logic controller that transmits and receives wireless signals, an EC discriminator coupled to said EC digital logic controller that evaluates received wireless signals, an EC analog to digital and digital to analog converter coupled to said EC digital logic controller that provides digital to analog and analog to digital signal conversion for signal processing and communication in both analog and digital form, and a relay coupled to said EC digital logic controller that selectively allows or disrupts passage of power between the electrical appliance and the power source external of the electrical appliance;

(b) selecting a wireless remote control (RC) device comprising an RC antenna, an RC digital logic controller for generating a plurality of control signals used to operate said wireless remote control device, an RC memory device coupled to said RC digital logic controller, an RC wireless transceiver coupled to said RC digital logic controller that transmits and receives wireless signals, an RC discriminator coupled to said RC digital logic controller that evaluates received wireless signals, and an RC analog to digital and digital to analog converter coupled to said digital logic controller that provides digital to analog and analog to digital signal conversion for signal processing and communication in both analog and digital form, a plurality of input keys coupled to said RC digital logic controller for entering input data into said RC digital logic controller, and a display for displaying messages generated by said RC digital logic controller;

(c) electrically attaching said electronic circuit between the electrical appliance and the power source external of the electrical appliance;

(d) storing an appliance identification code in the memory device of said electronic circuit;

(e) entering data in said RC digital logic controller with selected input keys that represent the identification code of said electrical appliance;

(f) having said wireless remote control device transmit a wireless signal to said electronic circuit;

(g) having said electronic circuit receive said wireless signal transmitted by said wireless remote control device;

(h) evaluating said wireless signal transmitted by said wireless remote control device to determine whether said wireless signal includes the identification code associated with said electrical appliance;

(i) allowing or disrupting passage of power between said electrical appliance and said power source external of said electrical appliance based on a wireless signal received by said electronic circuit that has been evaluated and includes the identification code associated with said electrical appliance;

(j) having said electronic circuit transmit a wireless signal to said wireless remote control device;

(k) having said remote control device receive said wireless signal transmitted by said electronic circuit;

(l) evaluating said wireless signal transmitted by said electronic circuit to determine whether the wireless signal includes the identification code associated with said electrical appliance; and, (m) displaying a status indication of said electronic circuit on said wireless remote control device display based on a wireless signal received by said wireless remote control device that has been evaluated and includes the identification code associated with said electrical appliance, the status indication indicating whether the state of the electronic circuit allows or disrupts the passage of power between said electrical appliance and said power source.

7. A method according to claim 6, further comprising the step of selecting a wireless signal for use with said wireless remote control device and said electronic circuit from the group consisting of radio frequency signals, microwave signals, magnetic field signals, infrared signals, optical signals, and acoustic signals.

* * * * *